(12) United States Patent
Cheung (10) Patent No.: US 7,575,493 B2
(45) Date of Patent: Aug. 18, 2009

(54) THERMOFORMED SPORTS BOARD

(76) Inventor: Wah Kan Cheung, 55 Doncaster Ave., Suite 102, Thornhill, Ontario (CA) L3T 1L7

( * ) Notice: Subject to any disclaimer, the term of this patent is extended or adjusted under 35 U.S.C. 154(b) by 0 days.

(21) Appl. No.: 12/072,052

(22) Filed: Feb. 23, 2008

(65) Prior Publication Data

US 2008/0146102 A1 Jun. 19, 2008

Related U.S. Application Data (63) Continuation-in-part of application No. 11/431,453, filed on May 10, 2006, now Pat. No. 7,404,749, and a continuation-in-part of application No. 11/985,895, filed on Nov. 19, 2007.

(60) Provisional application No. 60/693,567, filed on Jun. 27, 2005.

(51) Int. Cl.
| | |
|---|---|
| A63C 5/03 | (2006.01) |
| B63B 35/81 | (2006.01) |
| B63B 1/00 | (2006.01) |
| B63B 35/00 | (2006.01) |
| B63H 9/00 | (2006.01) |
| B63B 17/00 | (2006.01) |
| B63B 3/00 | (2006.01) |
| B63B 5/24 | (2006.01) |
| B28B 17/00 | (2006.01) |
| B28B 1/02 | (2006.01) |
| B32B 37/00 | (2006.01) |
| B29C 44/04 | (2006.01) |
| B29C 67/00 | (2006.01) |
| B29C 59/02 | (2006.01) |
| B29C 67/20 | (2006.01) |
| C04B 41/00 | (2006.01) |
| B27N 3/18 | (2006.01) |

(52) U.S. Cl. .................. 441/74; 441/65; 114/39.12; 114/39.14; 114/343; 114/355; 114/357; 425/263; 264/45.4; 264/45.6; 264/45.1; 264/46.4; 264/132; 264/319; 264/320; 264/321

(58) Field of Classification Search .................. 441/65, 441/74; 114/39.12, 39.14, 343, 355, 357; 425/363; 264/45.4, 45.6, 45.1, 46.4, 132, 264/319–321
See application file for complete search history.

(56) References Cited

U.S. PATENT DOCUMENTS

| 5,797,779 A * | 8/1998 | Stewart ........................ 441/74 |
| 5,928,045 A * | 7/1999 | Szabad ........................ 441/74 |
| 7,029,349 B2 * | 4/2006 | Lin ............................. 441/65 |
| 2005/0202737 A1 * | 9/2005 | Cheung ........................ 441/65 |

FOREIGN PATENT DOCUMENTS

FR 2460836 A * 3/1981

* cited by examiner

*Primary Examiner*—S. Joseph Morano
*Assistant Examiner*—Daniel V Venne
(74) *Attorney, Agent, or Firm*—Clement Cheng (57) ABSTRACT

The invention is directed to a molded foam sports board made by steps: molding a foam core having a molded contour surface; laminating an extruded adhesive resin layer to a polyolefin foam sheet layer forming a film foam laminate; and thermoforming and heat laminating the film foam laminate to the molded foam core by pressing the molded foam core towards the film side of the film foam laminate and mating against the profile of a thermoforming bottom die surface. The board has a thermoformed polyolefin foam skin having an outer surface and an inner surface, a molded foam core having a molded contour surface, an extruded adhesive resin layer bonding the inner surface of polyolefin foam skin layer to the molded contour surface of the molded foam core. The molded foam core may comprise homopolymer or copolymer of expanded polystyrene foam, expanded polyethylene foam, expanded polypropylene foam and polyurethane foam.

5 Claims, 6 Drawing Sheets

FIG. 11

# THERMOFORMED SPORTS BOARD

This application is a continuation in part of Wah Kan Cheung's application for Multi-layered sports board Ser. No. 11/431,453 filed May 10, 2006 now U.S. Pat. No. 7,404,749 the disclosure of which is incorporated herein by reference. This application claims priority from Wah Kan Cheung's thermoformed sports board provisional application 60/693,567 filed Jun. 27, 2005, the disclosure of which is incorporated herein by reference. This application claims priority and is a continuation in part of copending from Wah Kan Cheung's Ser. No. 11/985,895 Profile Bodyboard filed Nov. 19, 2007, the disclosure of which is incorporated herein by reference.

BACKGROUND OF THE INVENTION

A. Field of the Invention

The present invention relates to foam sports boards for recreational use, and more particularly to bodyboards or snow sleds having a thermoformed skin laminated to a foam core.

B. Discussion of Related Art

Body boards for riding waves and other recreational sports boards made of foam or other floatation material are known in the prior art. In general, such boards are made of a number of polyethylene foam and polyethylene film layers that are laminated together by heating the layers and then immediately passing them through a pair of nip rollers. The heating process causes adhesion by the localized collapse and bonding of the foam cells on the surface of the respective layers. Another conventional process of lamination is to apply heat to the film layer with a heated nip roller on the film side and a normal nip roller on the foam side, where the heated nip roller may be a flat roller. In most cases the surface of the heated nip roller contains an engraved pattern of convex and concave areas for better heat transfer. The resulting laminate of the polyethylene foam and polyethylene film is then often heat laminated onto a standard foam core.

Because the standard foam core does not have a perfectly flat or planar surface, adhesive contact between the film and foam core is limited to the apexes of the cells on the surface of the foam core. The point of contact is not uniform between the film and foam, but instead the film contacts the points of the outer surface of the core that protrude from the irregular cellular surface of the foam core.

Conventional film lamination methods typically use micro-cellular high density foam sheets to improve adhesion between the film and the foam core. The micro-cellular foam sheet contains smaller peaks and valleys with the peaks closer together. The surface area of contact between the sheet and foam is thereby increased. However, this kind of structure is still prone to delamination by mechanical contact forces and by the effects of heat and pressure when in use.

While it is known in the prior art that a thin layer of thermal plastic polyethylene film between a polyethylene foam sheet and a polyethylene film can be used to promote lamination, such thin layer of film is generally an unmodified low density polyethylene with limited efficacy. U.S. Pat. No. 5,647,784 to Moran, the disclosure of which is incorporated herein by reference, describes an intermediate bonding film layer between a polypropylene foam core and at least one upper or lower skin layer, which has a different chemical composition from the foam core material. Preferably, the intermediate layer is a terpolymer based on polyethylene vinylacetate and in the form of a thin, slit-film bonding adhesive. In the thermolamination process, the film melts and acts as glue between the different materials of the composite bodyboard.

U.S. Pat. No. 5,275,860 to D'Luzansky, et al., the disclosure of which is incorporated herein by reference, shows bodyboards and the like where the board comprises a closed cell foam core of polypropylene, a lower and upper skin of polyethylene and an intermediate layer heat bonded to the upper and lower skin. With the presence of an intermediate copolymer layer which is a mixture of 65% polypropylene and 35% polyethylene, the peel strength between the foam core and each of upper and lower skin is improved. Multi-layered bodyboards and methods of manufacture are well known in the art and one of such boards is described in application Ser. No. 10/797,995 filed on Mar. 11, 2004 and is incorporated herein by reference.

Bodyboards made by molding are well known in the art. The preferred embodiment comprises one or more channels shaped into the bottom of the board. Each channel may extend from the front to the back of the board. The top of the board may be contoured so that a person can comfortable place the upper torso portion of their body on the board. The board may further comprise a raised ridge along the front and side edges of the board to allow a rider to grasp the board. An example of a molded bodyboard is shown in the patent application US2006/0281377 to Blumenfeld, the disclosure of which is incorporated herein by reference.

Accordingly, there is need for adhesively bonded bodyboards with improved bonding between layers of different polymeric material having different surface contouring and cellular structure.

SUMMARY OF THE INVENTION

With parenthetical reference to the corresponding parts, portions or surfaces of the disclosed embodiment, the present invention provides an improved sports board 15 comprising a thermoformed polyolefin foam layer 16 having a thermoformed outer surface 17 and an inner surface 18, a molded plastic foam core layer 23 having a first surface 24 facing up and a second surface 25 facing down. The first surface 24 and the second surface 25 are both outer surfaces. The improved sports board also has an extruded adhesive resin layer 20 bonded to the inner surface of the polyolefin foam layer and the first outer surface of the plastic foam layer. The polyolefin foam may comprise polyethylene foam or polypropylene foam. The plastic foam layer may comprise expanded polyethylene foam (EPE), expanded polypropylene foam (EPP), expanded polystyrene foam (EPS), ethylene vinyl acetate foam (EVA) or polyurethane foam. The sports board may further comprise a bottom layer 26 of polyolefin film heat bonded to the outer surface of the polyolefin foam layer, with the polyolefin film possibly comprising polyethylene film or polypropylene film.

Accordingly, the general objective of the present invention is to provide an improved sports board in which different polyolefin materials may be used in the layers without loss of bond strength. Another objective is to provide an improved sports board that permits the layers to be laminated together using more efficient and less expensive laminating methods. Another objective is to provide an improved sports board with enhanced bond strength and flexibility along the bond line between the laminates. Another objective is to provide a method to adhere a thermoformed foam skin with sharp, distinct contour to a foam board.

Embodiments of the invention will now be described by way of example with reference to the accompanying drawings.

DETAILED DESCRIPTION OF THE PREFERRED EMBODIMENT

Like reference numerals identify the same structural elements, portions or surfaces, consistently throughout several drawing figures. Elements, portions or surfaces may be further described or explained by the entire written specification, of which this detailed description is an integral part. Unless otherwise indicated, the drawings are read (e.g., cross-hatching, arrangement of parts, proportion, degree, etc.) together with the specification, and are a portion of the entire description of this invention.

Figure 1:
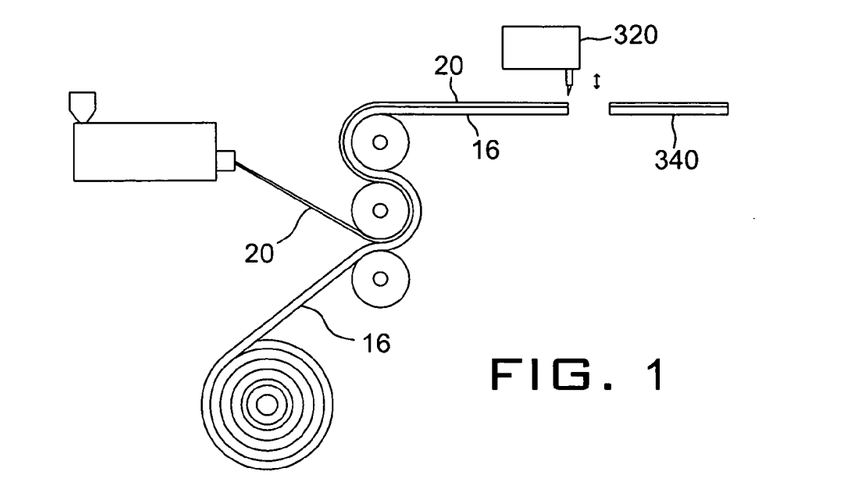
FIG. 1 is a diagram of a manufacturing process for creating multi-layer foam.

The invention shows a new process of making a foam sports board such as a body board for use in riding water waves, or a snow sled for use on snow slopes. The board may also be part of a sporting device such as a surfboard, snowboard, ski, roller board or flotation device. Skilled artisans can readily expand this list to include other known foam applications. FIG. 1 describes the process of forming the top layer 16 by applying a thin film of adhesive resin on one surface of a polyolefin foam sheet by conventional film extrusion process. The polyolefin foam may comprise homopolymers or copolymers of polyethylene foam or polypropylene foam. The polyolefin foam layer 16 is fed into nip rollers and adhesive resin such as a layer of ethylene methyl acrylate copolymer 20 can be extruded and applied to the foam layer 16. A cutting device 320 separates the continuous roll into sections of preferably rectangular sheets of laminate top board 340 comprising adhesive resin 20 and foam sheet 16.

The foam core of the present foam sports board may take the form of any foam board known in the art such as molded expanded polystyrene (EPS) foam and expanded polyolefin foam and polyurethane foam. Polyolefin foams useful as the foam core include homopolymers and copolymers of ethylene and propylene as well as a wide variety of blends with one or more such homopolymers and copolymers. The molded foam core has a thickness that is desirably from 0.25 inch to 3 inch, preferably form 1 inch to 2 inch.

The present invention is particularly useful with molded EPS foam core. Such foams are stiff and light weight and therefore are desirable for the application as a body board or a snow sled. The EPS foam core substantially enhances the flexural strength of the sports board while the polyethylene foam skin provides a soft, resilient and comfortable riding deck surface.

In one embodiment, the foam skin is a polyolefin foam sheet. The polyolefin foam skin may be polyethylene, polypropylene or a blend of one or more homopolymers and copolymers of polyethylene and polypropylene. The foam sheet may be a monolayer structure or a multilayer structure. In a multilayer structure, the foam sheet may be a laminate of two or more foam sheets, In another embodiment, the foam skin is a laminate of polyolefin foam sheet and polyolefin film and the polyolefin film is the surface film. Acceptable examples of polyolefin film include Surlyn, low density polyethylene (LDPE), high density polyethylene (HDPE), a blend of LDPE and HDPE and a blend of polyethylene and ethylene vinyl acetate (EVA). The film foam laminate may be prepared via conventional film extrusion and the foam sheet is applied and heat bonded to the hot extrudate of film. The surface film may be in the form of a monolayer film, a multiple-layer film, or a co-extruded multilayer film. The monolayer film or multiple-layer film can be coated with a layer of adhesive resin to enhance the bonding between the film and the foam sheet layers.

The desirable contour of molded foam core can be formed by a metal core mold that is generally fabricated using CNC machining techniques. Overlaying a thermoformed foam sheet to a foam core allows complex contour on a body board. One prior art has been described in Sneddon of U.S. Pat. No. 5,273,470 incorporated herein by reference describing a body board with rider purchase enhancing regions. The complex structure includes a purchase enhancing region including plural ridges extending diagonally across the region to improve rider stability. In the prior art, a surface pattern is generally first thermoformed on the top surface of a foam skin which is then heat laminated onto a foam core having a substantially planar receiving surface. In the present invention, deep depression and grooves can be made because the desirable contour has been molded on the foam core itself, so that the thermoformed foam skin can be mated and heat bonded to the foam core forming desirable geometric shapes such as grooves, ridges or a like profile. In the present invention, distinct depressions and raised areas can be made for enhancing performance of a bodyboard such as by providing grips or by providing features such as a knee pad for a knee board, a foot stopper or a seat retainer for a snow sled.

Figure 7:
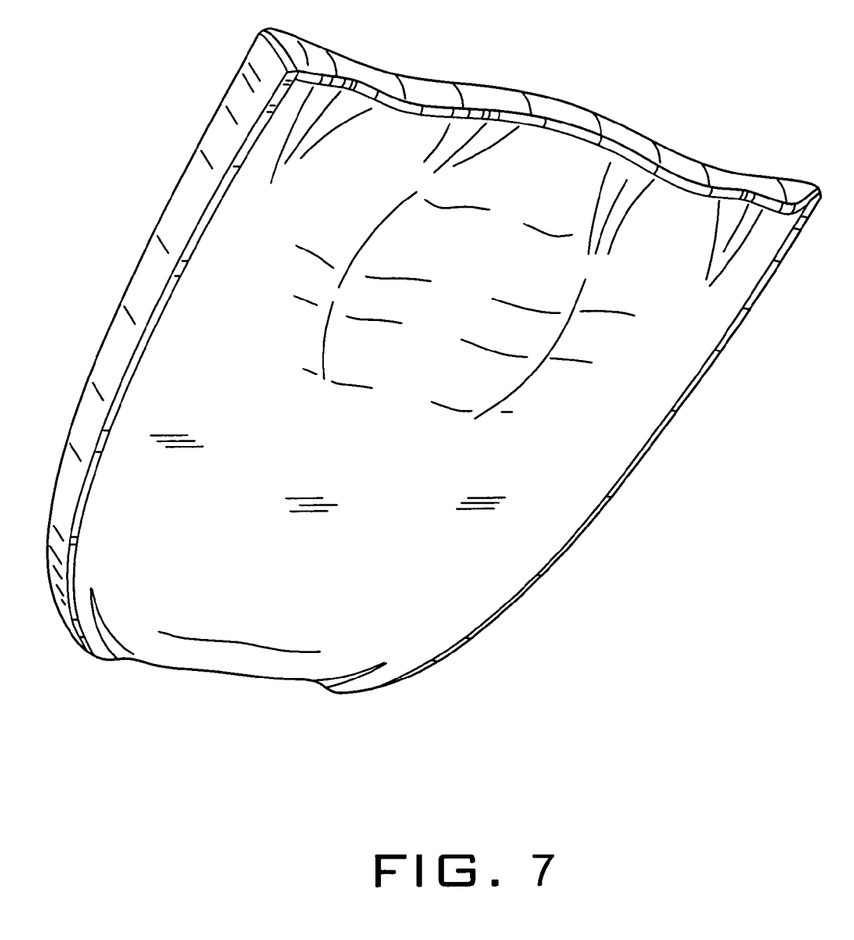
FIG. 7 is a perspective view showing the bottom channels of a sports board.
Figure 8:
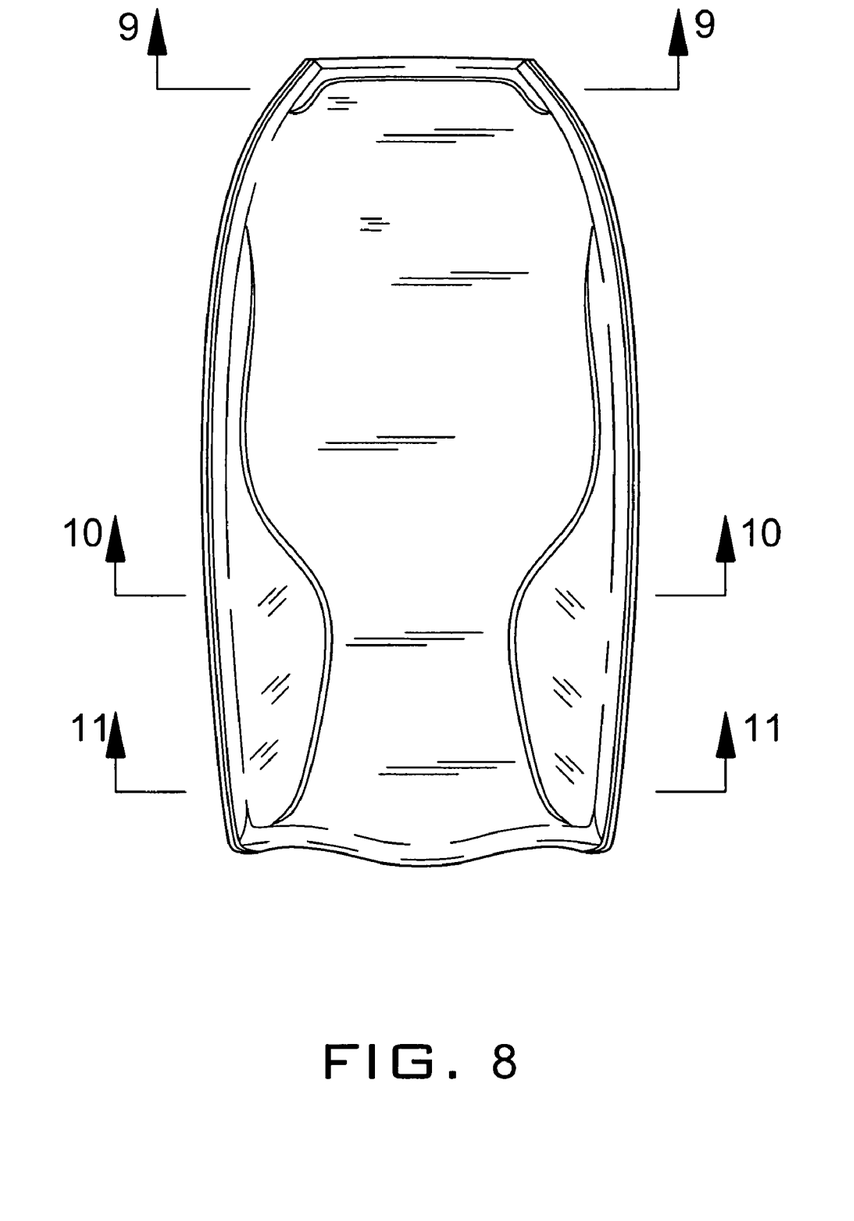
FIG. 8 is a top view of a sports board made according to the present invention.
Figure 9:
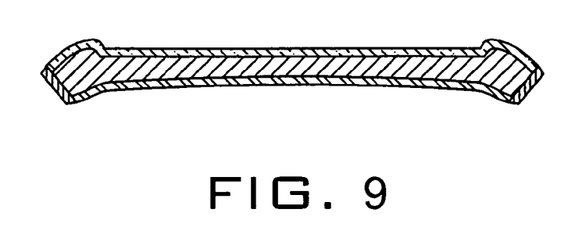
FIG. 9 is a nose section view.
Figure 10:
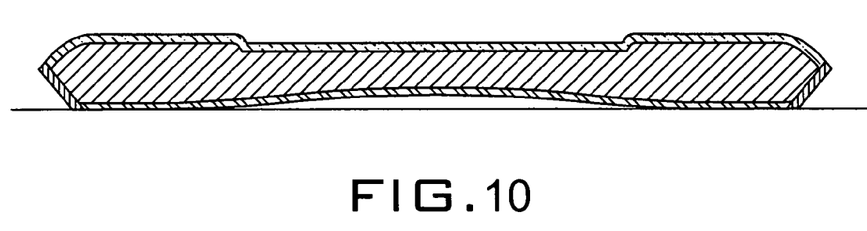
FIG. 10 middle section view.
Figure 11:
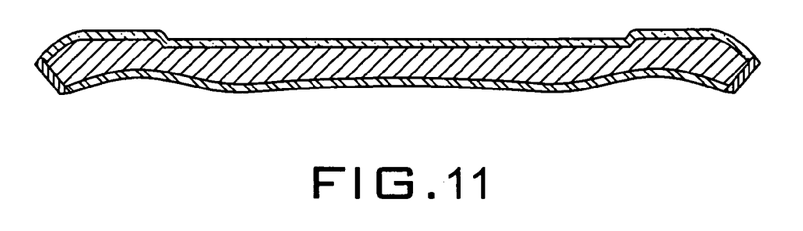
FIG. 11 tail section view.

Similarly, desirable contour may also be formed on the bottom surface of a bodyboard including features such as channels, grooves, distinct depressions and raised areas on the bottom. Bottom features are shown in FIG. 7, and can be made by rolling the bottom of the board with a pattern roller. The bottom features can also be made by hand. The bottom features can also be made by a press. FIG. 8 shows the top of a board showing channels in three sections FIGS. 9-11.

Figure 2:
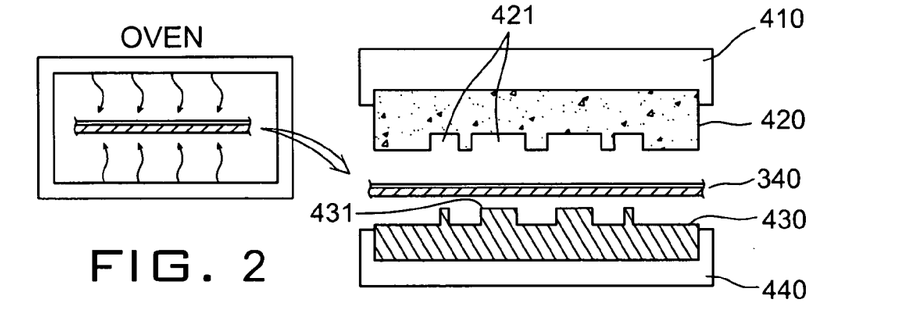
FIG. 2 is a diagram of a press mold in open position.

FIG. 2 shows assembly of the laminate skin 340 to the molded foam core 23. Preferably, the foam core 23 is preformed and pre-shaped. Various foam boards suitable for such applications include polyethylene, polypropylene, polystyrene and ethylene vinyl acetate copolymer. Foam boards may be made by various foaming methods. For example, a polystyrene foam board may be extruded polystyrene foam or molded expanded polystyrene foam. Typically, molded polystyrene foam is made by expanded polystyrene beads placed inside a mold and fused by injecting super heated steam into the mold. Preferably the foam core 23 is made of polystyrene foam and has a density in the range of 1.0 to 3 $lb/ft^3$, and preferably a density of 1.5 $lb/ft^3$. A molded foam core 420 has a plurality of surface features similar to the core mold used to create EPS core surface features. In the preferred embodiment, a foam core holder 410 holds the foam core 420 and presses the foam sheet 340 into a thermoforming mold 430. The thermoforming mold 430 preferably has a thermoforming mold holder 440. Enabling vacuum suction force between the workpiece that is the laminate top board 340 and the thermoforming mold 430 may also enhance the thermoforming process of the foam sheet 340. The mold cavity of thermoforming mold 430 is designed to conform to the contour of the finished foam board with the added thickness of the polyolefin foam skin.

To assure evenly distributed attachment, the following steps should be applied: Install thermoforming mold 430 as the bottom mold. Secure the molded foam core 420 to a fixture attached to the top plate with the molded contour facing downward and aligning with the mold 430. The molded foam core is physically used as a top mold to assist the thermoforming of the polyolefin foam skin. Thus, there is a top and bottom mold. The foam skin 340 can be heated inside an oven to a desirable temperature until thermoformable or thermoplastically deformable. Any conventional heating process can be applied to the foam skin 340. For example the film foam laminate can be heated by radiant heat, infrared heat, hot air or similar heating method. The heating device can be an oven, a heated conveyor system or the like. When the adhesive resin surface of the film foam laminate reach a temperature generally in the range of 180° F. to 220° F., the film foam laminate is placed on top of the bottom mold with the adhesive film layer facing upwards. The top plate moves down and deforms the laminate to the contour of the thermoforming mold 430. That temperature range encompasses the temperature at which polyethylene foam begins to soften (180 F) and the melting point of polyethylene foam (220 F). Instantaneously, the PE foam sheet is heat bonded to the foam core 420 through the intermediate adhesive resin layer.

Figure 3:
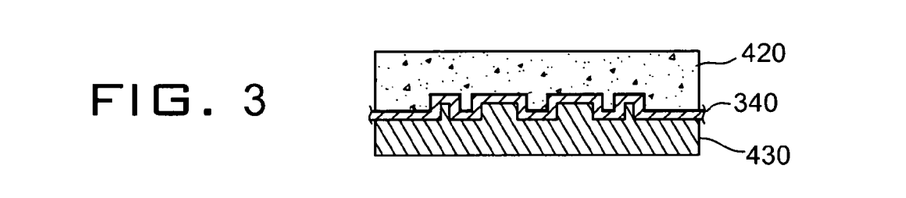
FIG. 3 is a diagram of a press mold in closed position.

FIG. 3 shows the thermoforming molding process where the molded foam core 420 presses against the thermoforming mold 430. The heated foam skin layer 340 deforms into hollows of the foam core 421 as the protrusions 431 of the thermoforming mold 430 are shaped to combine with the hollows of the foam core 421. The surface of the molded foam core 420 to be laminated to the foam skin layer is preferably also heated so that the adhesive resin will melt and stick to the molded foam core 420.

Figure 4:
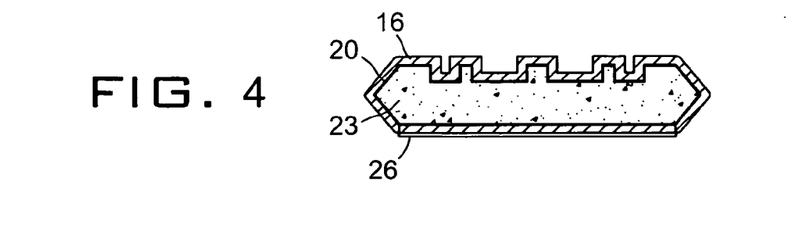
FIG. 4 is a diagram of an improved sports board.

FIG. 4 shows a cross section of a finished product that has been trimmed. The bottom skin and rail skin have been laminated to the foam core by conventional heat lamination. The contoured deck is now facing up as shown in the drawing. When surfing on waves, the user can grab onto the contoured deck. The bottom skin of the finished product usually comprises a low friction polyethylene film with backing foam sheet which is usually a high density polyethylene foam. The slick bottom surface allows a user to glide over water or snow.

Optionally, polyolefin foam skin 340 is first thermoformed using a mold conforming to the deck surface of core 23. The mold is dimensioned to allow layer 16 making a loose fit with the deck surface 17 of core 23 to compensate for the presence of the polyolefin foam skin 340 thicknesses. The thermoformed polyolefin foam skin is then inserted into the deck surface of the core 23. Heat is applied to both the adhesive resin side of the foam skin and the deck surface of the foam core 23. When the adhesive resin surface of the film foam laminate reaches a temperature generally in the range of 180° F. to 220° F., the foam core moves down and mates with the polyolefin foam skin. Also, foam skin 340 may extend over at least a part of the sides of core 20.

As a second embodiment method, the foam core is not pre-formed. Instead the foam core is formed or molded in situ and the foam core is bonded to the foam skin in the foaming process. The top and bottom foam skins are first thermoformed to the desirable contoured shape and placed to the top mold and bottom mold surfaces respectively. A thin layer of adhesive resin is applied to the inner surface of the top foam skin and bottom foam skin. Then plastic foam beads are placed inside the mold cavity and the top mold and bottom mold are closed. Hot steam is then passed into the cavity to expand the foam beads. The foam core is bonded to the adhesive layer of the top foam skin and bottom foam skin as a result of heat and pressure of the foaming in situ process. According to the second embodiment method, the sheet 340, FIG. 2 is already molded into a profile so that it is not flat when being pressed to fit with foam core 420. Preferably, the sheet 320 would have the same profile as the foam core 420.

As a third embodiment method, the foam core may also be formed by a thermoforming process inside a mold. The foam core is preferably a low density plastic foam made of thermoplastic materials such as polyethylene, polypropylene, and ethylene vinyl acetate copolymer. The foam core is not preformed. Instead a primary foam board is shaped from a foam plank to a rough dimension close to the desirable shape of the foam core. The top and bottom foam skins are preheated in an oven. The primary foam board is similarly preheated in an oven to bring the foam material to a thermo-formable temperature. All three elements are put inside a mold and pressure is applied to compress the three layers. Additional heating may also be applied to the foam core, top foam skin and bottom foam skin. The mold may be heated and hot steam may be injected into the mold cavity to maintain the desirable temperature for thermoforming. The low density foam core will be compressed to conform the shape of the mold cavity. The foam core is bonded to the adhesive layer of the top foam skin and bottom foam skin by the combined effect of heat and pressure in the thermoforming process. Alternatively, the top foam skin and/or the bottom foam skin may be first bonded to the primary foam board by heat lamination or by gluing. The laminate is heated inside an oven to the desirable thermoforming temperature and then placed to the mold cavity for thermoforming.

Figure 5:
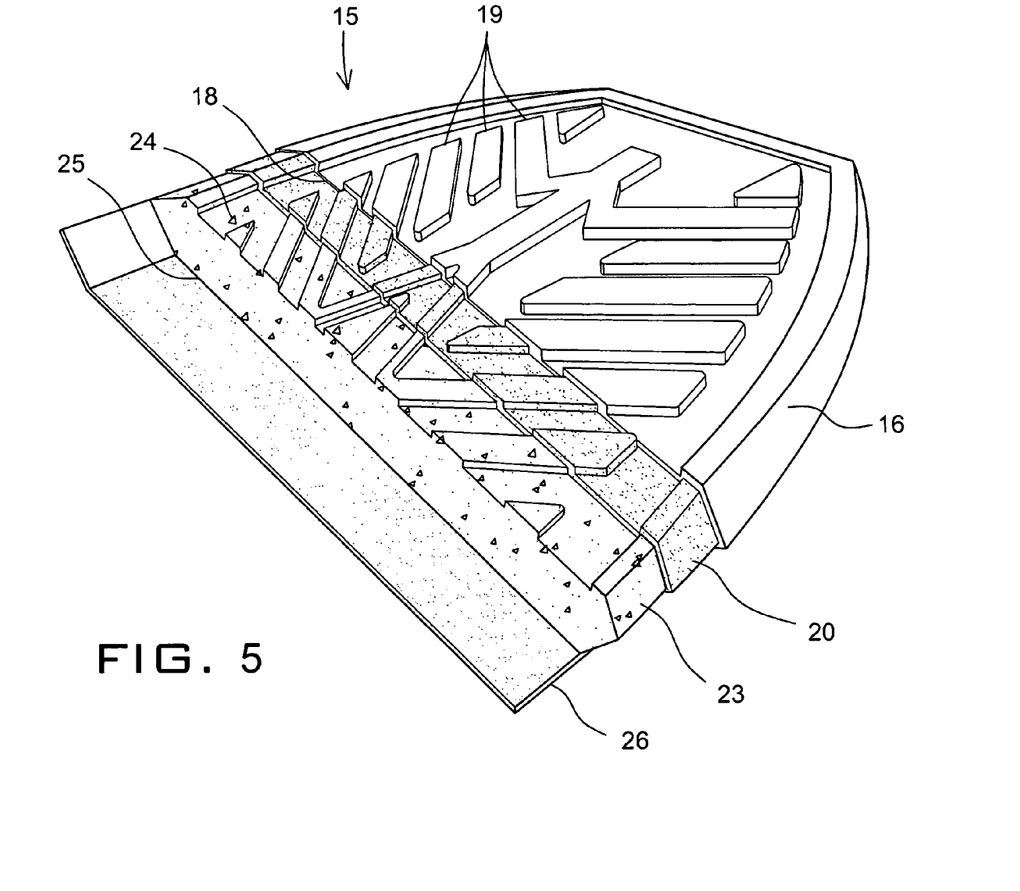
FIG. 5 is a perspective and partial sectional view of an embodiment of the bodyboard.

FIG. 5 shows a cross-section of the present invention which shows the improved bodyboard, the first embodiment of which is generally indicated as the improved sports board 15. As shown in FIGS. 1-2, bodyboard 15 is comprised of four layers laminated and thermoformed together. Top layer 16 is polyethylene foam. Top layer 16 has a thickness of between 2 mm to 8 mm, and preferably a thickness of 4.5 mm. Top layer 16 has a density in the range of 4 to 10 lbs/ft$^3$, and preferably a density of 7 lbs/ft$^3$.

Adhesive layer 20 is an ethylene and methyl acrylic copolymer. Adhesive layer 20 has a thickness of between 0.02 and 0.15 mm, and preferably a thickness of 0.07 mm. Adhesive layer 20 has a density in the range of 0.09 to 0.98 g/cm$^3$, and preferably a density of 0.95 g/cm$^3$. The ethylene methyl acrylate copolymer EMAC ™ that can be obtained at Eastman Chemical Company of 100 North Eastman Road, Kingsport, Tenn. 37662 may be employed in the preferred embodiment of the present invention. Generally hot melt glue or heat activated adhesive resin may also be used for the present application. Alternative adhesive resins, such as anhydride-modified ethylene/vinyl acetate, anhydride modified ethylene acrylate, ethylene/propylene copolymer, homogeneous ethylene/alpha-olefin copolymer, anhydride-modified polyolefin, ethylene/acrylic acid copolymer, vinyl acetate/acrylic copolymer, ethylene/methylacrylate copolymer, ethylene/vinyl acetate copolymer, and blends of the foregoing, may be employed. The BYNEL® adhesive resin, provided by Dupont Packaging, of 1007 Market Street, Wilmington, Del. 19898, may be employed in such an embodiment.

Foam core layer 23 is a molded foam. In the preferred embodiment, the foam core 23 is polystyrene foam. However, it is contemplated that other types of foam may be used, such as polyethylene, polypropylene foam or polyurethane foam. Layer 23 has a thickness of between 0.25 inch to 3 inch, and preferably a thickness of 1 inch to 2 inch. In the preferred embodiment, layer 23 is polystyrene foam and has a density in the range of 1.0 to 2.5 lbs/ft$^3$, and preferably a density of 1.5 lbs/ft³ which is preferred for rigidity since the foam core thermoformed face operates as a mold die against a rigid forming mold 430. If polyethylene foam is used, layer 23 would have a density in the range of 1.6 to 4 lbs/ft³, and preferably a density of 2.2 lbs/ft³, which again is preferred for rigidity since the foam core thermoformed face operates as a mold die against a rigid forming mold 430. If polypropylene foam is used, layer 23 would have a density in the range of 1.5 to 3 lbs/ft³, and preferably a density of 1.9 lbs/ft³.

Bottom layer 26 is preferably a slick skin polyethylene film but can also be a multiple layer laminated structure. Bottom layer 26 has a thickness of between 0.2 and 1.5 mm, and preferably a thickness of 0.35. Bottom layer 26 has density in the range of 0.91 to 0.98 g/cm³, and preferably a density of 0.95 g/cm³. A bottom extruded adhesive resin layer bonds the inner surface of the slick skin polyethylene film layer to the foam core.

The board 15 thus has a pattern 19 on its upper deck surface and it is shown in the drawing to have a plurality of bar shaped designs 19 on its upper deck surface 17 in a symmetrical form where the rider's arm portions may touch. Patterns 19 may be varied as long as they enhance board traction and grip.

With such core layer 23, board 15 evidences the series of steps. First, film layer 20 is well bonded by heat lamination to the bottom surface 25 of polystyrene foam layer. Layer 26 may also cover at least part of the sides of core 20. Any excess of layer 26 is trimmed to finish the bottom half of the board. Alternatively, the trimming step may be held until the other board half is done when trimming jobs can be performed all at once.

Figure 6:
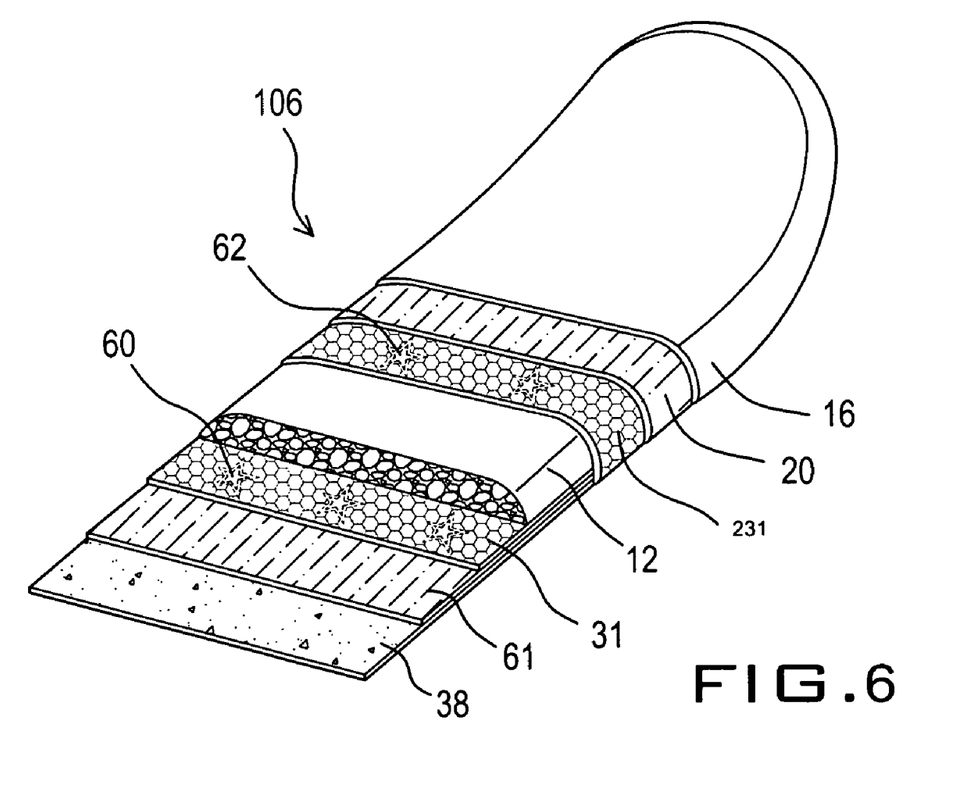
FIG. 6 is a diagram of an improved sports board with graphic imprinted skin.

As seen in FIG. 6, the top foam sheet 231 may include a graphic 62 imprinted directly on the top foam sheet 231, or the graphic may be printed on a plastic film and adhered as a separate layer on the top foam skin 231. Similarly, the bottom foam sheet 31 may also have a graphic 60 imprinted or adhered to the outside surface. The outside surface of the bottom foam sheet 31 faces downward and the outside surface of the top foam sheet 23 faces upward. The graphic layer may comprise a graphic printed on the outer surface of the polyolefin foam sheet covered by a transparent plastic protection film. The graphic layer can also be a layer of plastic film material, such as extruded polyethylene, a polyolefin foam sheet, and an adhesive resin film layer disposed on the underside for heat bonding the plastic film with the polyolefin foam.

In FIG. 6, a graphic imprinted sports board 106 of the present invention comprises polyethylene foam core 12, polyethylene film 16, adhesive resin film 20 and polyethylene top foam sheet 231. Graphic 60 may be imprinted on the outer surface of polyethylene foam sheet 231 for viewing from the top of the board 106. While its bottom layers include polyethylene foam sheet 31 and polyethylene bottom sheet 38 with an adhesive film 61 interposed between the two sheets 31 and 38. Another graphic 60 may be imprinted on the outer surface of sheet 31 for viewing from the bottom of the graphic board 106. If the foam core 12 has a different chemical composition such as a polystyrene foam core from the polyethylene foam layer 231 and 31, an adhesive resin film layer has to be interposed between the foam core and the polyethylene foam layers to achieve satisfactory bonding.

In a second embodiment, the graphic layer is adhered to the top foam sheet 231 or adhered to the bottom foam sheet 31 as a separated layer. The bottom surface of the polyethylene top foam sheet is bonded to the foam core 12. The combined thickness of the plastic film layer 16 and adhesive resin film layer 20 is generally in the range of 0.01 mm to 0.15 mm. The plastic film layer 16 is preferably transparent and includes graphic images printed on the inner surface facing the top adhesive resin film layer 20. Similarly the plastic film layer 38 may include graphic images printed on the inner surface facing the bottom adhesive resin film layer 61. Alternatively, the graphic images can be formed on an outer surface of the plastic film layer 16 facing away from the core 12.

The graphic images can be visible outside the plastic film. The graphic imprinted plastic film layer 16, 38 preferably has the same polymer composition as the foam sheet. The graphic imprinted plastic film layer 16, 38 does not need to be as large as the entire board. With the intermediate layer of adhesive resin, the plastic film also need not be of the same polymer composition as the foam sheet. The plastic film 16, 38 may be a monolayer structure or a multilayer structure. Preferred plastic film is a polyolefin film and polyethylene film is typically used for the present application. Polyethylene film is a common plastic film and graphic images can be printed on it by conventional printing technique well known in the art.

The bodyboard may include fastening devices to maintain the connection between the rider and the board. Suitable connectors here include snap buttons, snap rivets, straps, screws, bolts and nuts. A fastening device typically used in foam board is a pair of snap-rivets and snap-posts passing through aperture in the board. A strap is preferably fastened to the snap rivet and connected to a rider for securing the rider to the board.

The present invention contemplates that many changes and modifications may be made. Therefore, while the presently preferred forms of the improved bodyboard have been shown and described, and several modifications thereof discussed, persons skilled in this art will readily appreciate that various additional changes and modifications may be made without departing from the spirit of the invention, as defined and differentiated by the following claims.

The invention claimed is:

1. A method of applying a contoured thermoformed foam skin to a molded foam board, which has a thickness generally exceeding 0.25 inch, wherein the method comprises the steps of:
   molding a foam core having molded contour surface on at least one primary surface;
   applying an adhesive resin film layer to a polyolefin foam skin layer forming a film foam laminate;
   heat laminating the film side of the film foam laminate to the molded contour surface of the molded foam core in a press mold wherein the foam core acts as a face of a die for pressing against the film foam laminate;
   heating the film foam laminate to a temperature of about 180 F to 220 F;
   placing the heated film foam laminate on top of a thermoforming bottom die;
   thermoforming and heat laminating the film foam laminate to the molded foam core by pressing the molded foam core towards the film side of the film foam laminate and mating against the profile of thermoforming bottom die surface, wherein the contour surface of molded foam core operates as an upper thermoforming die when pressed onto the adhesive resin film layer adhered to the polyolefin foam sheet.

2. The method of applying a contoured thermoformed foam skin to a molded foam board of claim 1, further comprising the steps of:
   a. adhering a graphic film layer to a top foam sheet wherein the graphic film layer is transparent; and
   b. imprinting graphic images on an inner surface of the graphic film layer.

3. The method of applying a contoured thermoformed foam skin to a molded foam board of claim 2, further comprising the steps of:
   a. adhering a graphic film layer to a bottom foam sheet wherein the graphic film layer is transparent; and
   b. imprinting graphic images on an inner surface of the graphic film layer.

4. The method of applying a contoured thermoformed foam skin to a molded foam board of claim 1, further comprising the steps of:
   a. adhering a graphic film layer to a top foam sheet wherein the graphic film layer is transparent;
   b. imprinting graphic images on an inner surface of the graphic film layer;
   c. adhering a bottom graphic film layer to a bottom foam sheet wherein the bottom graphic film layer is transparent; and
   c. imprinting bottom graphic images on an inner surface of the bottom graphic film layer.

5. The method of applying a contoured thermoformed foam skin to a molded foam board as set forth in claim 4, wherein the thickness of the adhesive resin film layer ranges from 0.02 mm to 1.2 mm.

* * * * *